(12) United States Patent
Nakamura et al.

(10) Patent No.: US 11,472,487 B2
(45) Date of Patent: Oct. 18, 2022

(54) VEHICLE BODY

(71) Applicants: TOYOTA JIDOSHA KABUSHIKI KAISHA, Aichi (JP); SUBARU CORPORATION, Tokyo (JP)

(72) Inventors: Kentaro Nakamura, Toyota (JP); Osamu Shimasaki, Nisshin (JP); Daisuke Suewaka, Tokyo-to (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 4 days.

(21) Appl. No.: 17/163,564

(22) Filed: Feb. 1, 2021

(65) Prior Publication Data
US 2021/0284245 A1    Sep. 16, 2021

(30) Foreign Application Priority Data

Mar. 16, 2020    (JP) .............................. JP2020-045156

(51) Int. Cl.
| | |
|---|---|
| *B62D 25/14* | (2006.01) |
| *B62D 25/04* | (2006.01) |
| *B62D 27/02* | (2006.01) |
| *B62D 25/02* | (2006.01) |

(52) U.S. Cl.
CPC ......... *B62D 25/145* (2013.01); *B62D 25/025* (2013.01); *B62D 25/04* (2013.01); *B62D 27/023* (2013.01)

(58) Field of Classification Search
CPC .. B62D 25/025; B62D 25/04; B62D 25/2018; B62D 25/08; B62D 25/14; B62D 25/145
USPC ...... 296/29, 30, 70, 203.01, 203.02, 203.03, 296/187.09, 187.1, 193.06, 209
See application file for complete search history.

(56) References Cited

U.S. PATENT DOCUMENTS

| | | | |
|---|---|---|---|
| 2011/0233950 A1* | 9/2011 | Takita ................... | B62D 25/24 296/1.06 |
| 2017/0080978 A1* | 3/2017 | Yoshida ............. | B62D 25/2018 |

FOREIGN PATENT DOCUMENTS

| | | | | |
|---|---|---|---|---|
| JP | 2005193843 A | | 7/2005 | |
| JP | 2008094134 A | * | 4/2008 | ......... B62D 25/2018 |
| JP | 2008137419 A | | 6/2008 | |
| JP | 2019127163 A | * | 8/2019 | ............. B62D 21/00 |

* cited by examiner

*Primary Examiner* — Dennis H Pedder
(74) *Attorney, Agent, or Firm* — Hauptman Ham, LLP (57) ABSTRACT

A vehicle body may include a dash crossmember, a rocker extending rearwards from an end of the dash crossmember, a front pillar extends upwards from the rocker along the side portion of the cabin and a reinforcement plate including a first end joined to the dash crossmember and a second end joined to the front pillar. An inner wall of the dash crossmember may have an uneven shape that defines at least one bend extending in the right-left direction. The first end of the reinforcement plate may at least partly have a bent shape that conforms with the uneven shape of the dash crossmember.

11 Claims, 7 Drawing Sheets

VEHICLE BODY

CROSS-REFERENCE TO RELATED APPLICATION(S)

This application claims priority to Japanese patent application No. 2020-045156, filed on Mar. 16, 2020, the entire contents of which are incorporated herein by reference.

TECHNICAL FIELD

The technology disclosed herein relates to a vehicle body.

BACKGROUND

Japanese Patent Application Publication No. 2005-193843 describes a vehicle body. In this vehicle body, a dash crossmember and a front pillar are coupled to each other via a reinforcement plate. It is described that such a configuration prevents deformation of the front pillar toward a cabin in case of a lateral collision.

SUMMARY

An excellent anti-collision safety performance is needed for a vehicle body, and it is required to meet standards (safety standards) which should be met in a variety of collision tests. Among the tests, a Small Overlap (SOL) crash test is regarded as one of harshest collision tests in that a collision load is concentrated on a part of the vehicle body. The present disclosure provides a technology that can improve an anti-collision safety performance of a vehicle body, including a crash safety performance required in a small overlap crash test.

Present teachings provide a vehicle body defining at least a cabin. The vehicle body may comprise: a dash crossmember extending in a right-left direction along a front portion of the cabin; a rocker extending rearwards from an end of the dash crossmember along a side portion of the cabin; a front pillar extends upwards from the rocker along the side portion of the cabin; and a reinforcement plate comprising a first end joined to the dash crossmember and a second end joined to the front pillar. The dash crossmember may comprise an inner wall located proximate to a cabin and having an uneven shape that defines at least one bend extending in the right-left direction. At least a part of the first end of the reinforcement plate may have a bent shape that conforms with the uneven shape of the dash crossmember.

In the above-described structure, the uneven inner wall of the dash crossmember defines at least one bend along the right-left direction, and at least a part of the first end of the reinforcement plate joined to the inner wall has the bent shape conforming with the uneven inner wall. According to such a configuration, the dash crossmember and the reinforcement plate are increased in rigidities at a joint therebetween and are joined firmly. Consequently, the dash crossmember and the front pillar are coupled firmly to each other via the reinforcement plate, by which the dash crossmember under a crash load can be supported securely by the rocker and the front pillar. Deformation of the dash crossmember toward the cabin can thereby be prevented significantly even in, for example, a small overlap crash test.

BRIEF DESCRIPTION OF DRAWINGS

In FIGS. 1 to 9, the direction FR indicates a front direction of a front-rear direction, and a direction opposite thereto indicates a rear direction of the front-rear direction. The direction RH indicates a right direction of a right-left direction, and a direction opposite thereto indicates a left direction of the right-left direction. The direction UP indicates an up direction of an up-down direction, and a direction opposite thereto indicates a down direction of the up-down direction.

DETAILED DESCRIPTION

In an embodiment of the present technology, the reinforcement plate may have a shape that defines at least one bend extending from the first end to the second end. According to such a configuration, the reinforcement plate is further increased in rigidity, by which the dash crossmember and the front pillar are joined further firmly to each other by the reinforcement plate.

In an embodiment of the present technology, the second end of the reinforcement plate may be further joined to the rocker. According to such a configuration, the dash crossmember and the rocker are coupled further firmly to each other by the reinforcement plate.

In an embodiment of the present technology, the front pillar may comprise an inner wall located proximate to the cabin, the inner wall defining an opening. In this case, the reinforcement plate may cover at least a part of the opening. The reinforcement plate covering at least a part of the opening can prevent foreign objects from entering the cabin through the opening.

In the above-described embodiment, a cover plate may be attached to the reinforcement plate and the cover plate may entirely cover the opening. According to such a configuration, the reinforcement plate and the cover plate can be designed separately, by which the opening of the front pillar can entirely be covered with no influence on mechanical strength of the reinforcement plate.

In the above-described embodiment, a seal having a ring shape may be interposed between the cover plate and the front pillar. According to such a configuration, minute foreign objects or rainwater can be prevented from entering the cabin.

In an embodiment of the present technology, the dash crossmember may comprise a first dash crossmember and a second dash crossmember located above the first dash crossmember. In this case, the rocker may comprise a front end joined to an end of the first dash crossmember. The first end of the reinforcement plate may be joined to the second dash crossmember.

In an embodiment of the present technology, the vehicle body may further comprise a front side member extending frontwards from the dash crossmember. In this case, the front side member may have a front end connected to a bumper reinforcement via, for example, a crash box.

In the present disclosure, a simple expression "front-rear direction" means a front-rear direction of the vehicle body. Similarly, a simple expression "right-left direction" means a right-left direction of the vehicle body, and a simple expression "up-down direction" means an up-down direction of the vehicle body. For example, when the vehicle is arranged on a horizontal plane, the up-down direction of the vehicle body coincides with a vertical direction. The right-left direction of the vehicle body is a direction parallel to an axle of the vehicle, and the front-rear direction of the vehicle body is a direction parallel to the horizontal plane and perpendicular to the axle of the vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved vehicle bodies, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

With reference to the drawings, a vehicle body 10 according to an embodiment will be described. The vehicle body 10 according to the present embodiment can be adopted in, for example, but not particularly limited to, an electric vehicle. The electric vehicle herein widely means a vehicle that includes a motor driving one or more wheels. Examples of the electric vehicle include a rechargeable electric vehicle charged by an external power source, a fuel-cell vehicle including a fuel cell as a power source, a hybrid vehicle including an engine as well as a motor, and the like. It should be noted that the vehicle body 10 according to the present embodiment can be adopted not only to an electric vehicle but also to other types of vehicles such as, for example, an engine powered vehicle. The vehicle body 10 according to the present embodiment is constituted of metal, but a material constituting the vehicle body 10 is not limited to metal.

Here, the vehicle body 10 according to the present embodiment has a substantially symmetrical structure in the right-left direction. In the following description, therefore, the same reference signs are allotted to structures symmetrical in the right-left direction, and the structure on a right side will be mainly explained while redundant descriptions for the structures on a left side will be omitted. In other words, features that will be described below apply not only to the structures on the right side but also to the structures on the left side unless otherwise specified.

Figure 1:
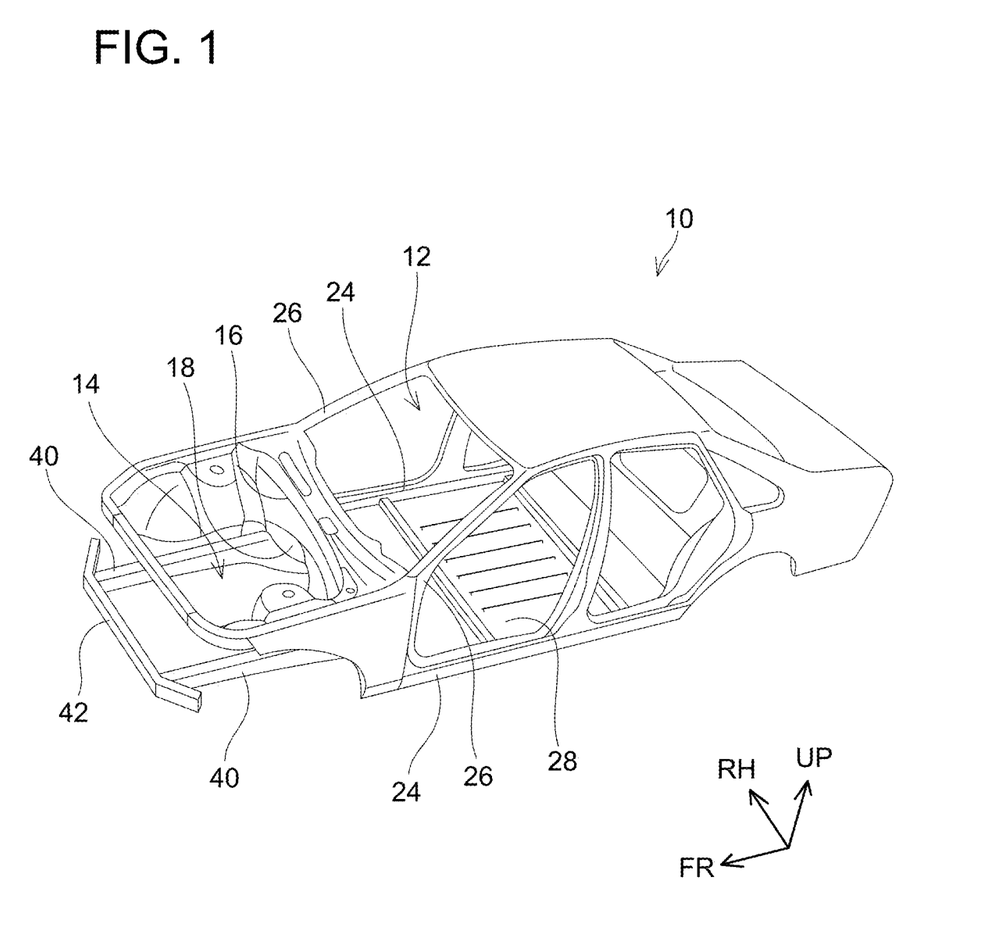
FIG. 1 shows an outer appearance of a vehicle body 10 according to an embodiment.
Figure 2:
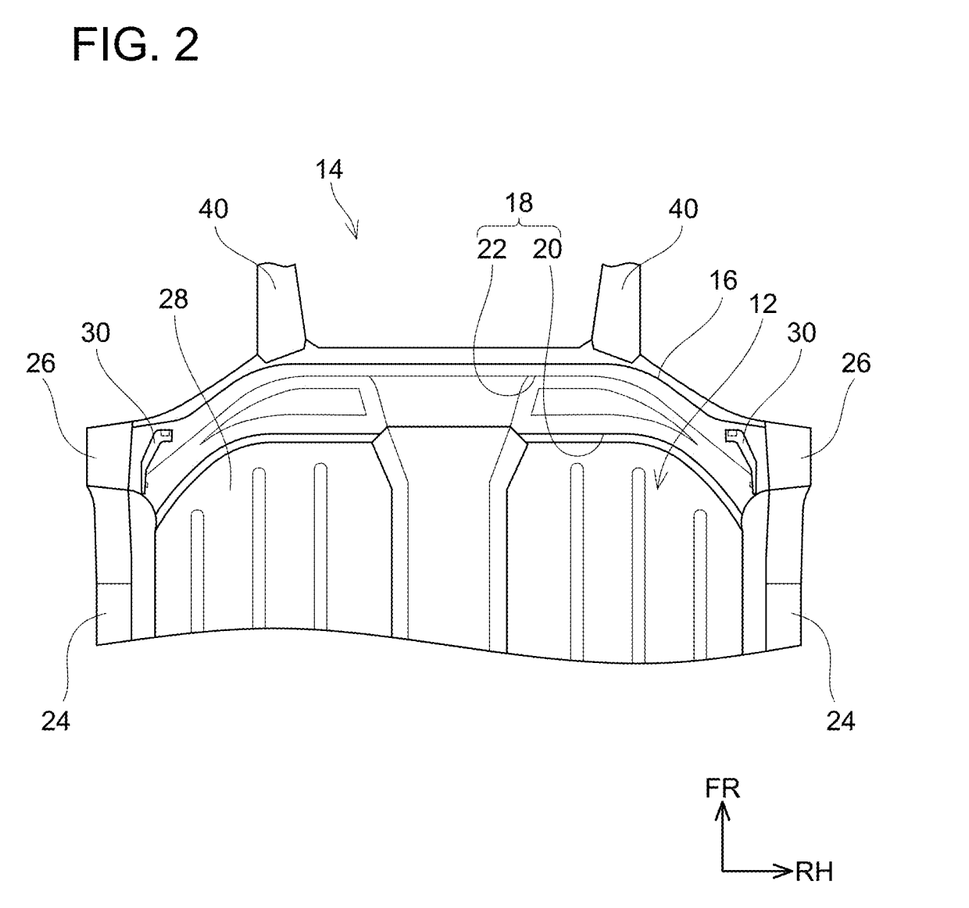
FIG. 2 is a plan view showing a part including a dash crossmember 18.
Figure 3:
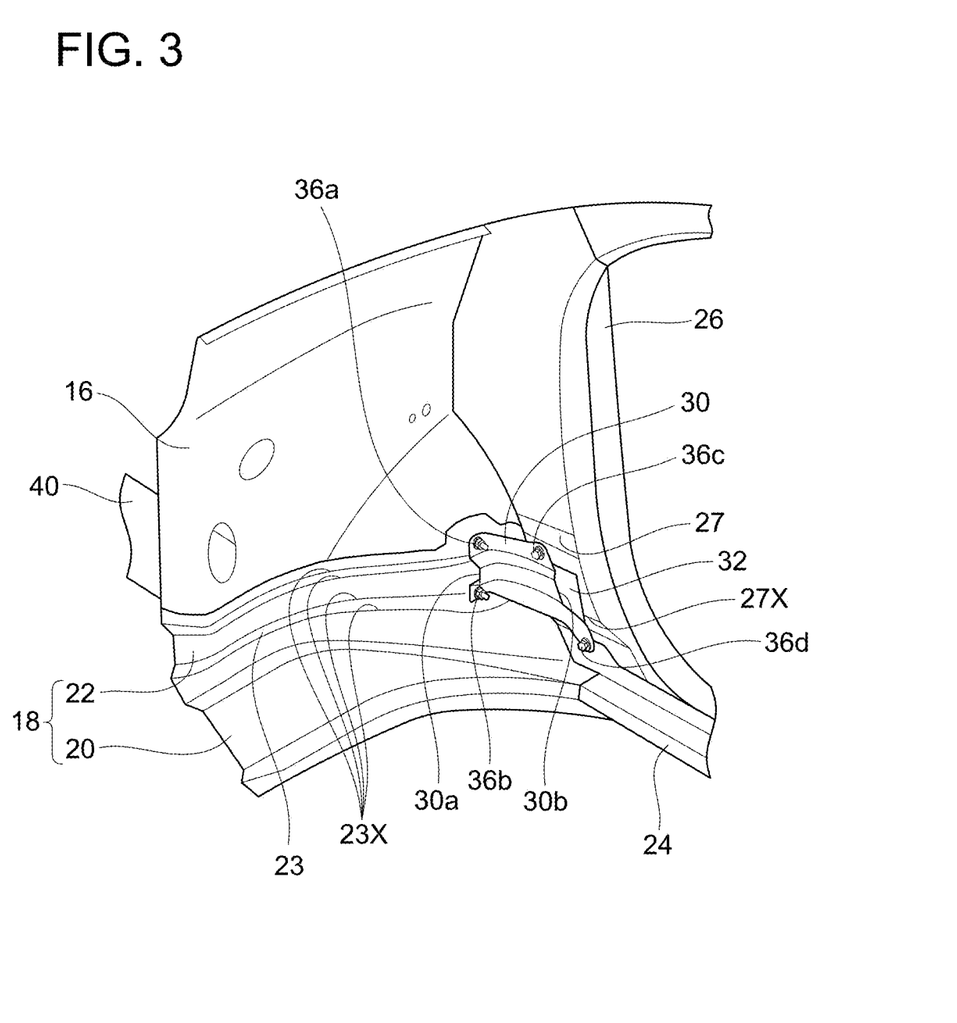
FIG. 3 is a perspective view showing a part to which a reinforcement plate 30 is attached.

As shown in FIGS. 1 to 3, the vehicle body 10 defines a cabin 12 and a front compartment 14 located forward of the cabin 12. The vehicle body 10 includes a dash panel 16 and a dash crossmember 18. The dash panel 16 is a partition that separates the cabin 12 from the front compartment 14. The dash panel 16 extends in the right-left direction and the up-down direction along a front portion of the cabin 12. The dash crossmember 18 is one of frames of the vehicle body 10. The dash crossmember 18 is provided along the dash panel 16 and extends in the right-left direction along the front portion of the cabin 12.

Figure 6:
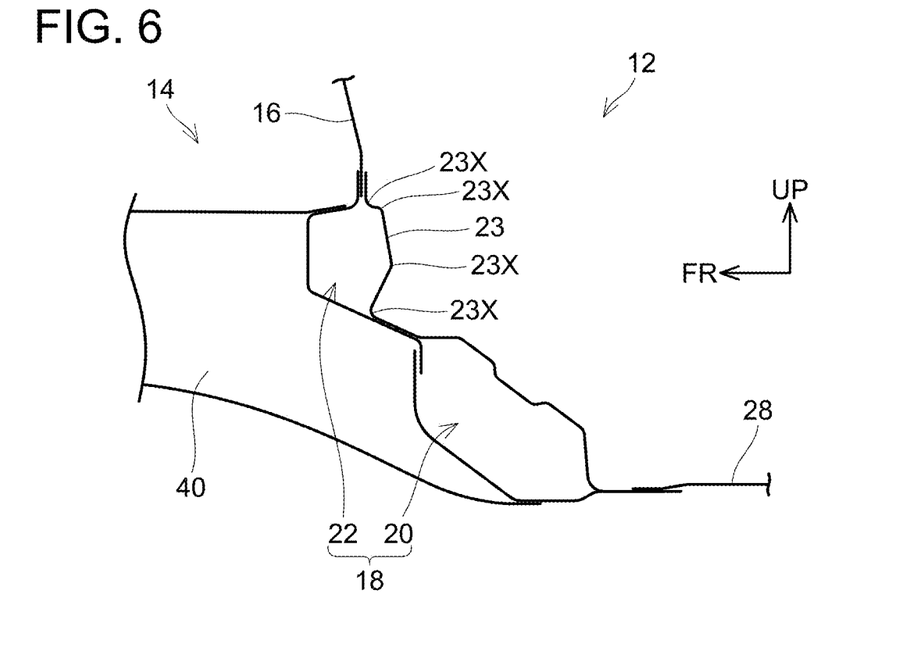
FIG. 6 is a cross-sectional view perpendicular to the right-left direction, showing a cross section of the dash crossmember 18.

The dash crossmember 18 in the present embodiment includes a first dash crossmember 20 and a second dash crossmember 22. The first dash crossmember 20 and the second dash crossmember 22 each have a tubular shape that defines an enclosed space along the right-left direction (see FIG. 6). The second dash crossmember 22 is located above the first dash crossmember 20, and the two dash crossmembers 20, 22 are adjacent to each other and extend in the right-left direction. Although not particularly limited, each of the two dash crossmembers 20, 22 has a cross-sectional shape different from each other, and a cross-sectional area of the first dash crossmember 20 is larger than a cross-sectional area of the second dash crossmember 22.

The vehicle body 10 further includes a pair of front side members 40. In the vehicle body 10, the pair of front side members 40 is provided symmetrically in the right-left direction. Each of the front side members 40 is one of the frames of the vehicle body 10 and located at the front compartment 14. The front side members 40 extend frontwards from the dash crossmember 18. Respective front ends of the front side members 40 are connected to a bumper reinforcement 42 via, for example, crush boxes.

The vehicle body 10 further includes a pair of rockers 24. In the vehicle body 10, the pair of rockers 24 is provided symmetrically in the right-left direction. Each of the rockers 24 is one of the frames of the vehicle body 10 and is also termed "side sill". A floor pan 28 that forms a floor of the cabin 12 is provided between the pair of rockers 24. One of the rocker 24 on the right side extends rearwards from a right end of the dash crossmember 18 (specifically, a right end of the first dash crossmember 20) along a right side portion of the cabin 12. The other of the rockers 24 on the left side extends rearwards from a left end of the dash crossmember 18 (specifically, a left end of the first dash crossmember 20) along a left side portion of the cabin 12. Although not particularly limited, each of the rockers 24 has a tubular shape that defines an enclosed space along the front-rear direction (see FIG. 8).

Figure 7:
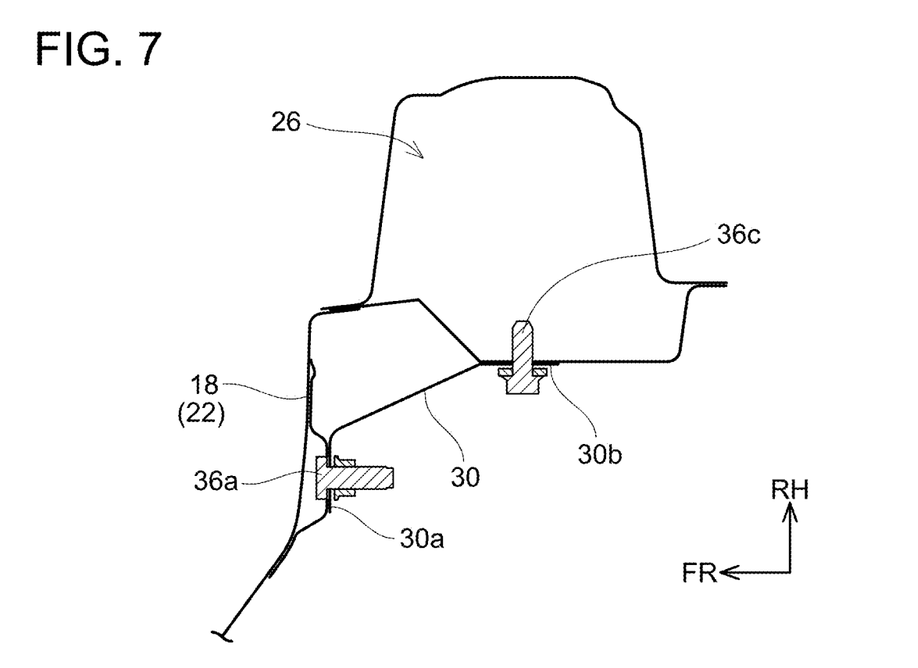
FIG. 7 is a cross-sectional view perpendicular to the up-down direction, showing the part to which the reinforcement plate 30 is attached.

The vehicle body 10 further includes a pair of front pillars 26. In the vehicle body 10, the pair of front pillars 26 is provided symmetrically in the right-left direction. Each of the front pillars 26 is one of the frames of the vehicle body 10 and is also termed "A pillar". One of the front pillars 26 on the right side extends upwards from the rocker 24 on the right side along the right side portion of the cabin 12. Similarly, the other of the front pillars 26 on the left side extends upwards from the rocker 24 on the left side along the left side portion of the cabin 12. Although not particularly limited, each of the front pillars 26 has a tubular shape that defines an enclosed space along the up-down direction (see FIG. 7).

The vehicle body 10 further includes a pair of reinforcement plates 30. In the vehicle body 10, the pair of reinforcement plates 30 is provided symmetrically in the right-left direction. Each of the reinforcement plates 30 is joined to the dash crossmember 18, a corresponding one of the rockers 24, and a corresponding one of the front pillars 26. Specifically, a first end 30a of each of the reinforcement plates 30 is joined to the dash crossmember 18 (specifically, the second dash crossmember 22) with fasteners 36a, 36b. A second end 30b of each of the reinforcement plates 30 is joined to corresponding one of the front pillars 26 with a fastener 36c and joined to corresponding one of the rockers 24 with a fastener 36d. Each of the reinforcement plates 30 is attached with the plurality of fasteners 36a to 36d, and hence can be detached in a case of, for example, maintenance or repair. It should be noted that the structure for joining the reinforcement plates 30 is not particularly limited. For example, the reinforcement plates 30 may be welded to the dash crossmember 18 and the front pillars 26.

Figure 4:
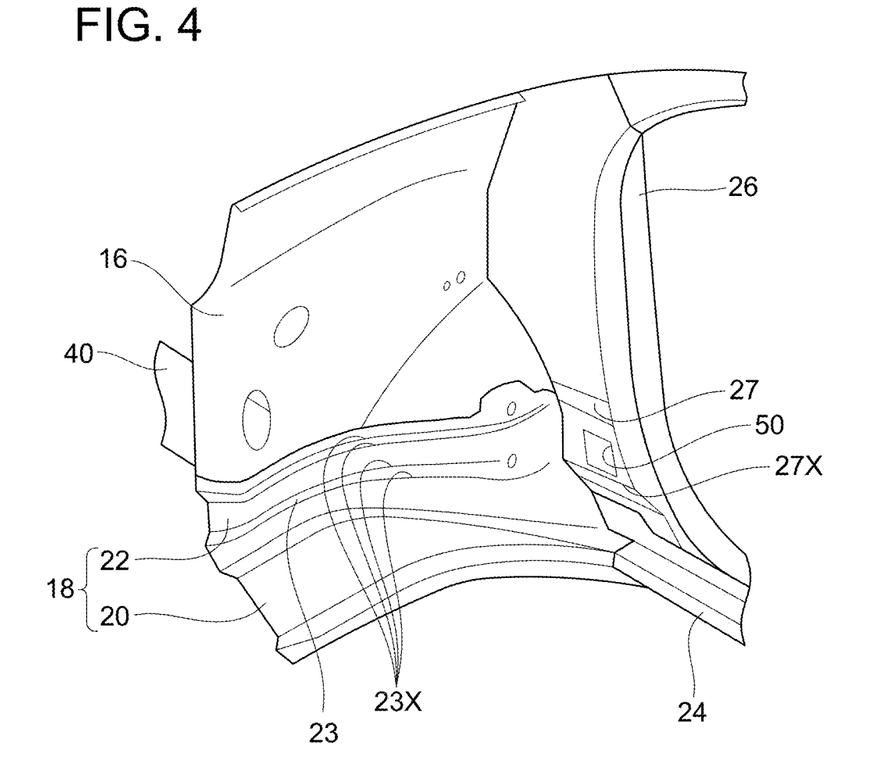
FIG. 4 is a perspective view of the part shown in FIG. 3 with the reinforcement plate 30 detached.
Figure 5:
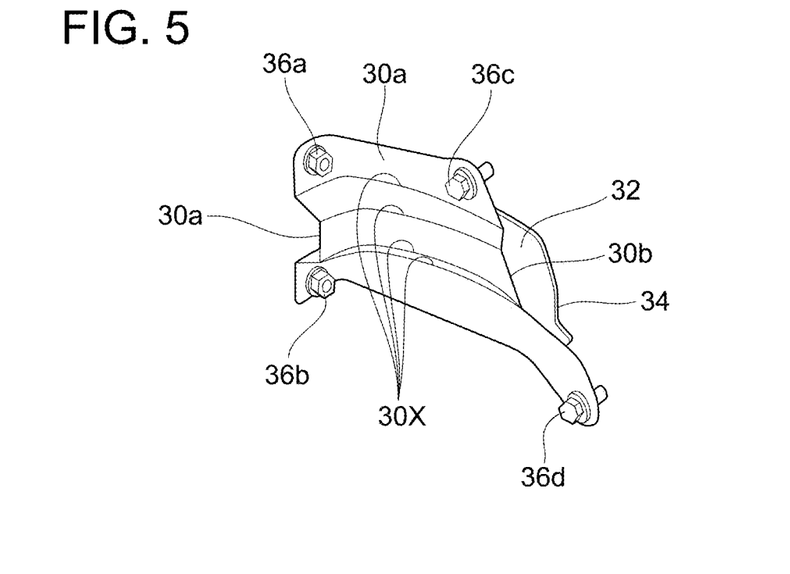
FIG. 5 is a perspective view showing the reinforcement plate 30.

As shown in FIGS. 3 to 5, an inner wall 23 of the dash crossmember 18 (specifically, the second dash crossmember 22) located proximate to a cabin 12 partly protrudes toward the cabin 12 and has an uneven shape. The inner wall 23 of the dash crossmember 18 thereby defines at least one bend 23X (e.g., a mountain-folded portion or a valley-folded portion) along the right-left direction. At least a part of the first end 30a of each of the reinforcement plates 30 joined to the inner wall 23 is given a bent shape that conforms with the uneven shape of the dash crossmember 18. Similarly, inner walls 27 of the front pillars 26 located proximate to the cabin 12 partly protrude toward the cabin 12 and have uneven shapes. Each of the inner walls 27 of the front pillars 26 thereby define at least one bend 27X along the front-rear direction. At least a part of the second end 30b of each of the reinforcement plates 30 joined to corresponding one of the inner walls 27 is given a bent shape that conforms with the uneven shape of corresponding one of the front pillars 26. It should be noted that each of the inner walls 27 of the front pillars 26 may have a flat surface that does not include the bend 27X. The second end 30b of each of the reinforcement plates 30 may have a flat shape accordingly.

As described above, in the vehicle body 10 according to the present embodiment, each of the reinforcement plates 30 are joined to the dash crossmember 18 and to corresponding one of the front pillars 26 and couple both of them to each other. At joints between the dash crossmember 18 and the reinforcement plates 30, the uneven inner wall 23 of the dash crossmember 18 defines at least one bend 23X along the right-left direction, and at least a part of each of the first ends 30a of the reinforcement plates 30 has the bent shape that conform with the uneven inner wall 23. According to such a configuration, the dash crossmember 18 and each of the reinforcement plates 30 are increased in rigidities at the joints therebetween and are joined firmly. Consequently, the dash crossmember 18 and each of the front pillars 26 are coupled firmly to each other via corresponding one of the reinforcement plates 30. Due to this, when the vehicle crashes at its front side, the dash crossmember 18 under a crash load can thereby be supported securely by the rockers 24 and the front pillars 26. Deformation of the dash crossmember 18 toward the cabin 12 can therefore be prevented significantly even in, for example, a small overlap crash test.

In the vehicle body according to the present embodiment, although not particularly limited, the uneven inner walls 27 of the front pillars 26 each define at least one bend 27X along the front-rear direction also at joints between the front pillars 26 and the reinforcement plates 30, and at least a part of the second end 30b of each of the reinforcement plates 30 has a bent shape that conforms with corresponding one of the uneven inner walls 27. The front pillars 26 and the reinforcement plates 30 are thereby increased in rigidities also at the joints therebetween and are joined firmly to each other.

The shapes of the reinforcement plates 30 are not specifically limited. Although this is merely an example, as shown in FIG. 5, each of the reinforcement plates 30 in the present embodiment has a so-called hat shape (a shape of a channel including a flange at its both ends), and its intermediate portion in the up-down direction protrudes continuously from the first end 30a to the second end 30b. Each of the reinforcement plates 30 thereby defines a plurality of bends 30X. When each of the reinforcement plates 30 defines at least one bend 30X extending from the first end 30a to the second end 30b, rigidities of the reinforcement plates 30 can be significantly increased. Because of the increased rigidities of the reinforcement plates 30, the dash crossmember 18 and each of the front pillars 26 are joined further firmly to each other by the reinforcement plates 30.

Figure 8:
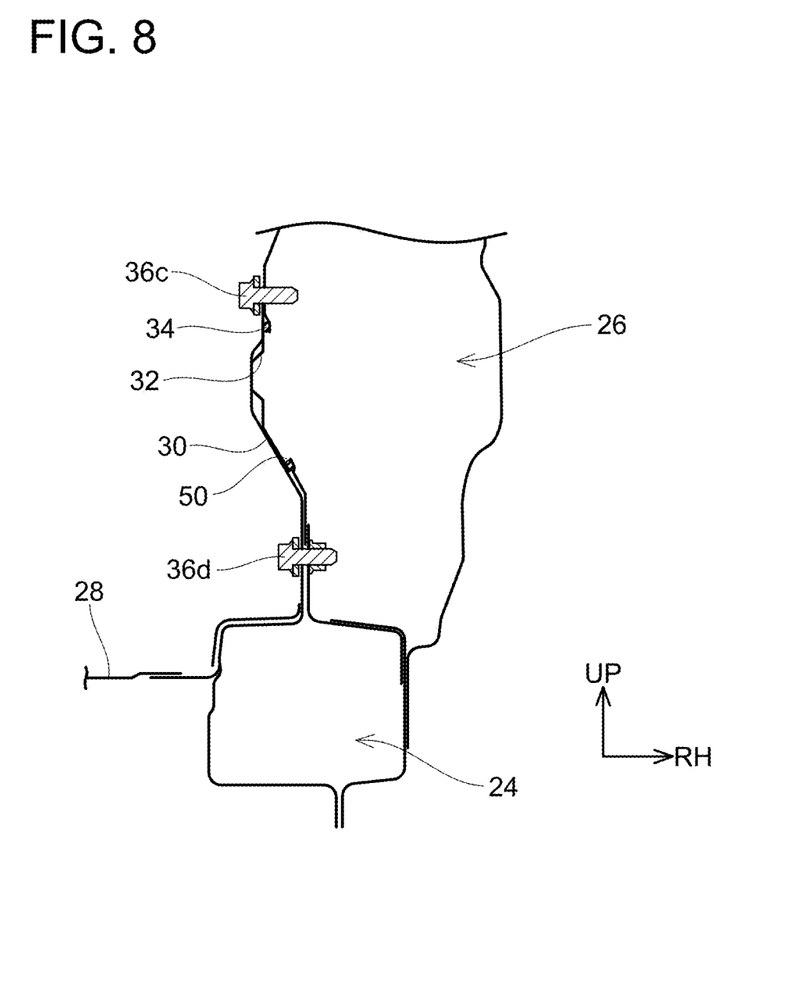
FIG. 8 is a cross-sectional view perpendicular to the front-rear direction, showing the reinforcement plate 30 and a cover plate 32 that cover an opening 50 in a front pillar 26.
Figure 9:
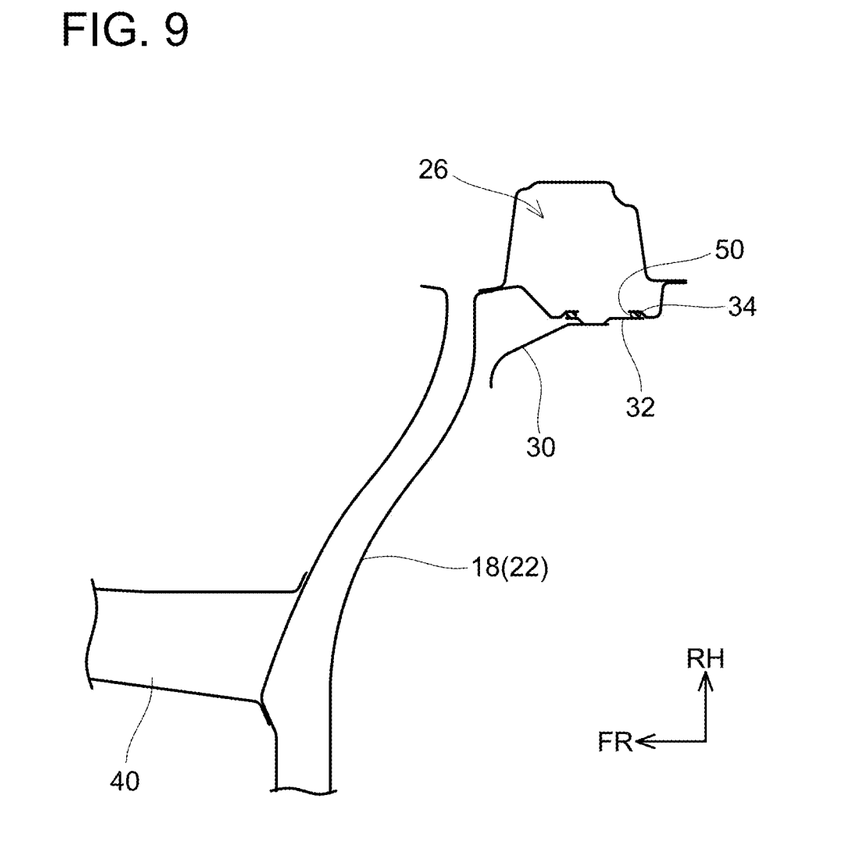
FIG. 9 is a cross-sectional view perpendicular to the up-down direction, showing the reinforcement plate 30 and the cover plate 32 that cover the opening 50 in the front pillar 26.

As shown in FIG. 4, the inner wall 27 of the front pillar 26 may define an opening 50. In this case, the reinforcement plate 30 may be arranged to cover at least a part of the opening 50. When the reinforcement plate 30 covers at least a part of the opening 50, foreign objects can be prevented from entering the cabin 12 through the opening 50. As shown in FIGS. 5, 8, and 9, a cover plate 32 that entirely covers the opening 50 is attached to the reinforcement plate 30 in the present embodiment. If the reinforcement plate 30 and the cover plate 32 are members independent of each other, the reinforcement plate 30 and the cover plate 32 can be designed separately, by which the opening 50 in the front pillar 26 can entirely be covered reliably with no influence on mechanical strength of the reinforcement plate 30. Moreover, a seal 34 having a ring shape is interposed between the cover plate 32 and the front pillar 26. The seal 34 surrounds the opening 50 and prevents minute foreign objects or rainwater from entering the cabin 12.

As described above, in the vehicle body 10 according to the present embodiment, the dash crossmember 18 includes the first dash crossmember 20 and the second dash crossmember 22 located above the first dash crossmember 20. The rockers 24 include front ends connected to the first dash crossmember 20. On the other hand, the reinforcement plates 30 are joined to corresponding one of the second dash crossmembers 22. It should be noted that, as another embodiment, the dash crossmember 18 may be a single member, or may be configured with an assembly of three or more dash crossmembers.

What is claimed is:

1. A vehicle body defining at least a cabin, the vehicle body comprising:
a dash crossmember extending in a right-left direction along a front portion of the cabin and comprising an inner wall located proximate to the cabin, the inner wall of the dash crossmember having an uneven shape that defines at least one bend extending in the right-left direction;

a rocker extending rearwards from an end of the dash crossmember along a side portion of the cabin;

a front pillar extending upwards from the rocker along the side portion of the cabin and comprising an inner wall located proximate to the cabin, the inner wall of the front pillar being directly connected to the inner wall of the dash crossmember and having an uneven shape that defines at least one bend extending in a front-rear direction; and a reinforcement plate comprising a first end joined on the inner wall of the dash crossmember and a second end joined on the inner wall of the front pillar, the reinforcement plate having a shape that defines at least one bend extending from the first end to the second end such that the at least one bend of the reinforcement plate conforms with the at least one bend of the inner wall of the dash crossmember at the first end, and the at least one bend of the reinforcement plate conforms with the at least one bend of the inner wall of the front pillar at the second end.

2. The vehicle body according to claim 1, wherein the second end of the reinforcement plate is further joined to the rocker.

3. The vehicle body according to claim 1, wherein the inner wall of the front pillar defines an opening, and the reinforcement plate covers at least a part of the opening.

4. The vehicle body according to claim 3, wherein a cover plate is attached to the reinforcement plate and the cover plate entirely covers the opening.

5. The vehicle body according to claim 4, wherein a seal having a ring shape is interposed between the cover plate and the front pillar.

6. The vehicle body according to claim 1, wherein the dash crossmember comprises a first dash crossmember and a second dash crossmember located above the first dash crossmember, the rocker comprises a front end joined to an end of the first dash crossmember, and the first end of the reinforcement plate is joined to the second dash crossmember.

7. The vehicle body according to claim 1, further comprising a front side member extending frontwards from the dash crossmember.

8. The vehicle body according to claim 1, wherein the inner wall of the front pillar defines an opening, and a cover plate is disposed between the inner wall of the front pillar and the reinforcement plate, the cover plate entirely covering the opening.

9. The vehicle body according to claim 8, wherein the cover plate has a shape that defines a raised portion raised toward the reinforcement plate and being in direct contact with the reinforcement plate.

10. The vehicle body according to claim 8, wherein the reinforcement plate is detachably attached to the dash crossmember and the front pillar with a plurality of fasteners, and the cover plate is detachable from the opening of the inner wall of the front pillar by detaching the reinforcement plate from the dash crossmember and the front pillar.

11. The vehicle body according to claim 10, wherein the plurality of fasteners comprises a first fastener that fixes the reinforcement plate to the dash crossmember, a second fastener that fixes the reinforcement plate to the front pillar and a third fastener that fixes the reinforcement plate to the rocker.

* * * * *